United States Patent Office 2,714,109
Patented July 26, 1955

2,714,109

PROCESS FOR THE PRODUCTION OF NICOTINIC ACID ESTERS

August Kottler and Ernst Seeger, Biberach an der Riss, Germany, assignors to "Dr. Karl Thomae G. m. b. H., Chemisch-pharmazeutische Fabrik," Biberach an der Riss, Germany No Drawing. Continuation of application Serial No. 250,562, October 9, 1951. This application September 15, 1953, Serial No. 380,341

Claims priority, application Germany October 9, 1950

1 Claim. (Cl. 260—295.5)

The present invention relates to a method for the production of nicotinic acid esters producing a hyperemesizing effect.

It is known that the nicotinic acid ester of tetrahydrofurfuryl alcohol as well as the nicotinic acid alkyl ester, which contain the 4–8 carbon atoms in the alkyl residue, produce a hyperemesizing effect upon the skin. On the other hand the capillary dilating action of esters of nicotinic acid with low-molecular alcohols is only of short duration.

According to the present invention nicotinic acid esters of longer duration of action that produce a hyperemesizing effect are obtained by the conversion of nicotinic acid, nicotinic acid anhydride or nicotinic acid halogenides with the monoalkyl-, aryl- or aralkyl ethers of ethylene glycols, of need be in the presence of solvents. Naturally the work can also be done in such wise that alkyl esters of nicotinic acid are esterified with the monoalkyl-, aryl- or aralkyl-ethers of ethylene glycols.

The monoalkyl-, aryl- or -aralkyl-ethers of ethylene glycol or diethylene glycol serve as esterification components.

The conversion can advantageously be conducted in the presence of dehydrating or acid binding agents.

As has been established, the semi-esters of nicotinic acid with ethylene glycols, the second hydroxyl group is alkylated, arylated or aralkylated, show an excellent and long-lasting hyperemesizing effect upon the skin and therefore can find pharmaceutical application.

If the conversion is conducted of the initial substances in the presence of organic solvents use can then be made for example of benzene, toluene, carbon tetrachloride, etc.

As dehydrating agents for the execution of the process according to the invention hydrochloric acid and sulphuric acid among others are suitable.

When nicotinic acid halogenides are used as initial material pyridine, dimethyl aniline, etc. come into consideration for the absorption of the nascent hydrogen halide.

The execution of the process according to the invention is to be explained in greater detail hereinunder in the light of some examples of execution:

Example 1

61.5 g. of nicotinic acid is treated with 260 g. of pure thionyl chloride and is heated for 30 minutes on the reflux condenser. The principal quantity of the thionyl chloride is then distilled off at usual pressure and the remainder in vacuum at an outside temperature not exceeding 70° C. To the crystal cake of nicotinic acid chloride-hydrochloride after a reflux condenser has been set up there is added a mixture of 83 g. of ethylene glycol monopropyl ether and 64 g. of anhydrous pyridine. The mixture is vigorously shaken, whereupon intense heating comes about, up to complete solution. After standing for several hours water is added and so much sodium carbonate until no carbonic acid evolves any longer. The separated oily liquid is subjected to vacuum distillation.

Nicotinic acid-β-propoxy-ethyl ester.
B. P.$_{17}$=165° C., oily, yellowish liquid.

Example 2

A mixture of 61.5 g. of nicotinic acid and 125 g. of ethylene glycol monopropyl ether is heated with passage of a hydrochloric acid gas jet for four hours in the oil bath of about 140° C. and is worked up as indicated in Example 1.

Nicotinic acid-β-propoxy-ethyl ester.
B. P.$_{17}$=165° C.

Example 3

Under anhydrous conditions the nicotinic acid chloride-hydrochloride obtained from 61.5 g. of nicotinic acid is treated with a solution of 118 g. of ethylene glycol monobutyl ether and 100 g. of anhydrous pyridine with vigorous shaking, whereupon the intense development of heat sets in and solution occurs. The reaction mixture is worked up as in Example 1.

Nicotinic acid-β-butoxyethyl ester.
B. P.$_{11}$=166–167° C., oily, yellowish fluid.

Example 4

36 g. of nicotinic acid chloride-hydrochloride is mixed with a solution of 30 g. of ethylene glycol monophenyl ether, 40 gr. of anhydrous pyridine and 30 g. of benzene. The mixture is heated for an hour in the vapor bath and is worked up after cooling off as in Example 1.

Nicotinic acid-β-phenoxyethyl ester.
B. P.$_5$=195–196° C., yellowish, oily liquid.

Example 5

36 g. of nicotinic acid chloride-hydrochloride is mixed with a solution of 30 g. of ethylene glycol monobenzyl ether, 20 ccm. of anhydrous benzene and 40 ccm. of anhydrous pyridine. For the completion of the reaction heating is done for two hours on the vapor bath. The elaboration goes on as in Example 1.

Nicotinic acid-β-benzyloxy ethyl ester.
B. P.$_5$=205° C. (with nitrogen), oily yellowish liquid.

Example 6

100 g. of nicotinic acid ethyl ester and 300 g. of ethylene glycol monobutylether, advisably with the addition of 1 g. of nicotinic acid as catalyst and with passage of a stream of nitrogen, are kept for six hours on the air condenser in the oil bath in intense boiling. After that the liquid is subjected to vacuum distillation and the mixture of nicotinic acid ethyl ester and nicotinic acid-β-butoxyethyl ester gone over after the removal of the surplus ethylene glycol monobutylether is shaken out with water. The water insoluble layer is again distilled in the vacuum. The nicotinic acid-β-butoxyethyl ester obtained has at 11 mm. a B. P. of 166–167° C.

Example 7

Nicotinic-acid-ω-ethoxydiethylene glycol ester.

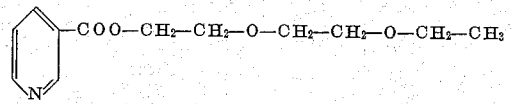

123 g. of nicotinic acid is compounded with 400 g. of pure thionyl chloride and is heated for 30 minutes with reflux. The principal quantity of the surplus thionyl chloride is distilled at usual pressure and the rest in vacuum, if need be with the addition of benzene. To the nicotinic acid chloride-hydrochloride so obtained there is added with reflux condensation and thorough shaking a mixture of 160 g. of diethylene glycol monoethyl ether and 200 g. of anhydrous pyridine, whereupon intense heating occurs. After complete solution has set in the material is allowed to stand for a number of hours, then there is added water and so much sodium carbonate until no carbonic acid any longer escapes. The separated oily liquid is subjected to vacuum distillation. There was obtained a yield of 109 g. of an oily yellowish liquid of B. P.=179–181° C. at 12 mm.

*Example 8*

Nicotinic acid-ω-butoxydiethylene glycol ester.

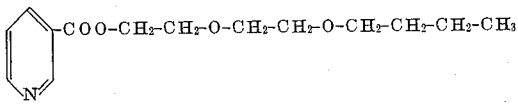

The nicotinic acid chloride-hydrochloride obtained from 123 g. of nicotinic acid is compounded, with reflux condensation and strong shaking, with a mixture of 194 g. of diethylene glycol monobutyl ether and 200 g. of anhydrous pyridine, whereupon heating and solution occur. After a number of hours of standing the mixture of reaction is worked up as described in Example 7. There was obtained a yield of 107 g. of an oily yellowish liquid of B. $P._{14}$=196–198° C.

*Example 9*

Nicotinic acid-ω-ethoxydiethylene glycol ester. 123 g. of nicotinic acid and 250 g. of diethylene glycol monoethyl ether are put into a flask that is provided with a wide, long glass tube serving as air cooler, a gas introduction tube reaching into the liquid and an appropriate thermometer. The flask is in an oil bath that is heated in such wise that the liquid that is found in the flask is kept under constant, intense boiling. At the same time through the gas introduction tube a constant stream of nitrogen is conducted. The temperature of the liquid rises in the course of five hours right along from 190° C. to 205° C. After that it is allowed to cool, suction filtering is done of the nicotinic acid not converted, which is used again for the next mixture and distilling is done in vacuum. There was obtained a yield of 110 g. B. P.= 179–180° at 12 mm.

*Example 10*

Nicotinic acid-ω-ethyoxydiethylene glycol ester.

100 g. of nicotinic acid ethyl ester and 300 g. of diethylene glycol monoethyl ether advisably with addition of 1 g. of nicotinic acid as catalyst and with passage of an inert gas jet are kept for 12 hours on the air cooler in the oil bath under constant boiling. After the cooling the reaction mixture is distilled in vacuum. The portion of unchanged diethylene glycol monethyl ether at first going over is separated and the mixture now following consists of nicotonic acid ethyl ester and nicotinic acid-ω-ethyoxydiethylene glycol ester. After shaking with water there is obtained an oily layer, which is distilled again in vacuum.

The yield amounts to 80 g. B. P.=179–181° C. at 12 mm.

This application is a continuation of our copending application, Serial No. 250,562, filed October 9, 1951, and entitled "Process for the Production of Nicotinic Acid Esters" and now abandoned.

What we claim is the following:

Nicotinic acid esters having the formula:

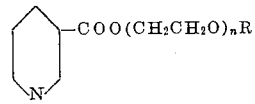

wherein $n$ is a numeral taken from the group consisting of 1 and 2, and R is an alkyl group having up to 4 carbon atoms, phenyl and benzyl.

References Cited in the file of this patent
UNITED STATES PATENTS

| | | |
|---|---|---|
| 1,970,578 | Schoeller | Aug. 21, 1934 |
| 2,510,164 | Woodward | June 6, 1950 |